United States Patent
Gu et al.

(10) Patent No.: US 8,082,591 B2
(45) Date of Patent: Dec. 20, 2011

(54) AUTHENTICATION GATEWAY APPARATUS FOR ACCESSING UBIQUITOUS SERVICE AND METHOD THEREOF

(75) Inventors: Jabeom Gu, Seoul (KR); Jaehoon Nah, Daejeon (KR); Jongsoo Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 626 days.

(21) Appl. No.: 12/212,714

(22) Filed: Sep. 18, 2008

(65) Prior Publication Data

US 2009/0158034 A1    Jun. 18, 2009

(30) Foreign Application Priority Data

Dec. 17, 2007 (KR) .................. 10-2007-0132540

(51) Int. Cl.
*G06F 7/04* (2006.01)
*G06F 15/16* (2006.01)
*H04L 9/32* (2006.01)
*H04N 7/16* (2011.01)

(52) U.S. Cl. ............... 726/29; 713/168; 726/12; 725/25

(58) Field of Classification Search .................... 726/12, 726/29; 713/168; 725/25
See application file for complete search history.

(56) References Cited

U.S. PATENT DOCUMENTS

| | | | | |
|---|---|---|---|---|
| 7,283,803 | B2 * | 10/2007 | Karaoguz et al. | 455/406 |
| 7,627,341 | B2 * | 12/2009 | Wu | 455/556.1 |
| 7,739,503 | B2 * | 6/2010 | Sato et al. | 713/169 |
| 2002/0035546 | A1 * | 3/2002 | Aoki | 705/52 |
| 2004/0076128 | A1 * | 4/2004 | Rao et al. | 370/328 |
| 2004/0098592 | A1 * | 5/2004 | Taki | 713/176 |
| 2005/0027982 | A1 * | 2/2005 | Haparnas et al. | 713/168 |
| 2005/0122943 | A1 * | 6/2005 | Hyun et al. | 370/338 |
| 2005/0130586 | A1 * | 6/2005 | Gnuschke et al. | 455/3.06 |
| 2005/0169214 | A1 * | 8/2005 | Suomela | 370/331 |
| 2005/0247779 | A1 * | 11/2005 | Ohkubo et al. | 235/383 |
| 2006/0126812 | A1 * | 6/2006 | Carlson et al. | 379/156 |
| 2006/0178777 | A1 * | 8/2006 | Park et al. | 700/245 |
| 2006/0242692 | A1 * | 10/2006 | Thione et al. | 726/9 |
| 2006/0272023 | A1 * | 11/2006 | Schmeidler et al. | 726/26 |
| 2007/0078797 | A1 * | 4/2007 | Won et al. | 705/408 |
| 2007/0130463 | A1 * | 6/2007 | Law et al. | 713/168 |
| 2007/0224980 | A1 * | 9/2007 | Wakefield | 455/418 |
| 2007/0232271 | A1 * | 10/2007 | Dyck et al. | 455/411 |
| 2008/0064392 | A1 * | 3/2008 | Tokoro | 455/426.1 |
| 2008/0066176 | A1 * | 3/2008 | Hamid | 726/21 |
| 2008/0069120 | A1 * | 3/2008 | Thomas | 370/401 |
| 2008/0108308 | A1 * | 5/2008 | Ullah | 455/41.2 |
| 2008/0155648 | A1 * | 6/2008 | Chae et al. | 726/1 |

(Continued)

FOREIGN PATENT DOCUMENTS

KR    1020040015802 A    2/2004

(Continued)

*Primary Examiner* — Michael Pyzocha
(74) *Attorney, Agent, or Firm* — Ladas & Parry LLP

(57) ABSTRACT

An authentication gateway apparatus for accessing a ubiquitous service includes: an authentication server of a service provider that receives an authentication data request message from a portable apparatus, and provides an authentication token; a first authentication device of the portable apparatus that transmits the authentication data request message to the authentication server, receives and stores an authentication token from the authentication server, and is used as a representative authentication device; and second authentication devices of ubiquitous apparatuses that are connected to the first authentication device of the portable apparatus by a wireless communication system, and have individual unique values.

19 Claims, 4 Drawing Sheets

U.S. PATENT DOCUMENTS

| | | | | |
|---|---|---|---|---|
| 2008/0220760 A1* | 9/2008 | Ullah | | 455/420 |
| 2008/0268815 A1* | 10/2008 | Jazra et al. | | 455/411 |
| 2009/0037734 A1* | 2/2009 | Kito | | 713/168 |
| 2009/0054058 A1* | 2/2009 | Andreasson et al. | | 455/426.1 |
| 2009/0096574 A1* | 4/2009 | Oberle | | 340/5.8 |
| 2009/0239502 A1* | 9/2009 | Dempo et al. | | 455/411 |
| 2010/0144275 A1* | 6/2010 | Satou | | 455/41.2 |

FOREIGN PATENT DOCUMENTS

| | | |
|---|---|---|
| KR | 1020040018367 A | 3/2004 |
| KR | 1020060122693 A | 11/2006 |
| KR | 1020070037983 A | 4/2007 |
| KR | 1020070037984 A | 4/2007 |
| KR | 2007-0067734 A | 6/2007 |
| KR | 2007-0068255 A | 6/2007 |

* cited by examiner

Authentication Token

AUTHENTICATION GATEWAY APPARATUS FOR ACCESSING UBIQUITOUS SERVICE AND METHOD THEREOF

RELATED APPLICATIONS

The present application claims priority to Korean Patent Application Serial Number 10-2007-0132540, filed on Dec. 17, 2007, the entirety of which is hereby incorporated by reference.

BACKGROUND OF THE INVENTION

1. Field of the Invention

The present invention relates to an authentication gateway apparatus for accessing a ubiquitous service and a method thereof. In particular, the present invention relates to an authentication gateway apparatus for accessing a ubiquitous service that uses a portable apparatus as an authentication gateway, which is a representative authentication device, and when a ubiquitous service is provided over the portable apparatus and other ubiquitous apparatuses, such as a computer, a display, and an acoustic apparatus, allows only the authentication gateway to perform authentication while other ubiquitous apparatuses are authenticated through the authentication gateway, thereby eliminating the inconvenience of performing authentication each time and preventing leakage of authentication information, and a method thereof.

This work was supported by the IT R&D program of MIC/IITA [2005-S-090-03, Development of P2P Network Security Technology based on Wired/Wireless IPv6 Network].

2. Description of the Related Art

Ubiquitous computing performs user authentication anytime and anywhere using various devices, such as a mobile communication terminal, a personal digital assistant (PDA), a PMP (Portable Multimedia Player), an HPC (Handheld PC), a portable Internet (WiBro: Wireless Broadband) terminal, and an embedded system, and provides various information services to the user.

In general, for the ubiquitous service, like the Internet environment, authentication, authorization, and accounting are required. That is, for the ubiquitous service, it is necessary to perform user authentication before the service is provided, to determine whether or the user is authorized to use the service, and to check whether or not the user pays a fee according to a predetermined accounting policy.

In the ubiquitous service, the use of available devices near the user can be maximized. For example, it is assumed that the user is authorized through the server with his/her cellular phone, downloads photographs from the server, and shows the photographs to neighboring people. If no other displays exist near the user, the user can only use a display having a 340×240 size, which is attached to his/her cellular phone or PDA. If a network monitor having a large LCD screen is available near the user or other people, the ubiquitous service can provide a service that shows the photographs to the people using the large network monitor.

To construct the ubiquitous environment, functions to transmit/receive data and control signals between the large network monitor and the server need to be provided. However, in view of user authentication, the ubiquitous service has the following problems.

First, even if the user is authorized using his/her cellular phone, to show the photographs using a new device, for example, a large network monitor, he/she must be authorized again. That is, for the ubiquitous service, authentication needs to be performed each time a new device is used.

Second, when the user inputs user authentication information using the large network monitor, which is provided in a public place, and transmits the user authentication information to the server, if the network monitor does not guarantee security, a third person may illegally obtain and misuse the user authentication information.

Third, since the devices for the ubiquitous service have to include an input unit, such as a keyboard or a mouse, to input the user authentication information, costs for installation and management are increased.

Alternatively, the user may directly download the photographs using his/her cellular phone, and may transmit the photographs from the cellular phone to the large LCD screen to display the photographs on the large LCD screen. In view of cost to use a mobile communication network and the transfer rate, however, this method is not economical.

When the user wants to see the photographs with his/her cellular phone, the photographs having a 320×240 size are downloaded. Meanwhile, in the large LCD screen, to output the photographs with high resolution, the photographs having a 1024×768 size or larger need to be downloaded. According to this method, cost to use the mobile communication network is increased, and it takes a lot of time to transfer the photographs.

In the worst case, it may be impossible to provide a general-purpose service. For example, information that is downloaded by one device is permitted to be only used in that device, such that copying of the information to another device is against the digital rights management (DRM). According to the digital rights management (DRM), copying is usually prohibited. Accordingly, there is a need for a simple method that resolves this problem.

In the above-described example, the change of the display from the small LCD of the cellular phone to the large LCD at a public place means that the same service is provided with different qualities. In the ubiquitous environment, service is generally provided with different service qualities according to the locations of the user or usable devices.

Accordingly, the ubiquitous service provides the same photographs with different qualities.

According to the above-described example, it is assumed that the large LCD display has a network function, and thus a large LCD display having a network function may be easily implemented as "device for ubiquitous environment".

There are known some authentication methods in the related art. According to the known user authentication devices and methods, even if the user uses a computer at a public place, and the user authentication information leaks, a plurality of authentication units are provided so as to prevent an unauthorized person from accessing the user authentication information. However, this user authentication method has a problem in that, when using the computer at a public place, the user needs to be directly authorized with his/her computer.

In the known mobile device authentication methods and devices, to eliminate the inconvenience of performing authentication each time a mobile device communicates with a new device, subsequent authentication depends on initial authentication of a home network, for example, an access point (AP).

Accordingly, in the ubiquitous environment, when various devices, such as a computer, a display, and an acoustic apparatus, uses a service at a public place, there is a need for a new method that can eliminate the inconvenience of performing authentication each time, and can prevent leakage of authentication information.

SUMMARY OF THE INVENTION

The invention has been finalized in order to solve the above-described problems. It is an object of the invention to provide an authentication gateway apparatus for accessing a ubiquitous service, which uses a portable apparatus, such as a PDA, a PMP, a cellular phone, a portable Internet (WiBro) terminal, a notebook computer, as an authentication gateway, and when a ubiquitous service provides the same service over various ubiquitous apparatuses, such as a computer, a display, and an acoustic apparatus, with different qualities, allows the authentication gateway to perform authentication in connection with an authentication server on behalf of the ubiquitous apparatuses, thereby eliminating the inconvenience of performing authentication each time and preventing leakage of authentication information, and a method thereof.

According to an aspect of the invention, an authentication gateway apparatus for accessing a ubiquitous service includes: a first authentication device of a portable apparatus that transmits an authentication data request message to an authentication server of a service provider, and receives and stores an authentication token from the authentication server; a plurality of ubiquitous apparatuses that are connected to the portable apparatus by a wireless communication system; and second authentication devices that are connected to the first authentication device of the portable apparatus by the wireless communication system, have individual unique values, and are correspondingly attached to, incorporated in, or connected to the ubiquitous apparatuses.

The first authentication device of the portable apparatus may include: a main authentication unit that transmits the authentication data request message to the authentication server, and receives and stores the authentication token from the authentication server; and a first wireless communication unit that performs wireless communication with the second authentication devices.

Each of the second authentication devices may include: a second wireless communication unit that performs wireless communication with the first authentication device of the portable apparatus; and an auxiliary authentication unit that receives a request to transmit the unique value of the corresponding second authentication device from the first authentication device of the portable apparatus, and transmits the stored unique value of the second authentication device to the first authentication device of the portable apparatus.

The first authentication device of the portable apparatus may operate as an authentication gateway, which is a representative authentication device, according to a user's button input after receiving the authentication token from the authentication server.

The second authentication devices may be correspondingly attached to, incorporated in, or connected to the ubiquitous apparatuses, and may be connected to the authentication server of the service provider through different network paths.

The authentication server may use together at least two of an authentication method using a one-time password, an authentication method using an IC card, an authentication method using a security token, an authentication method using biological recognition, an authentication method using a PKI (Public Key Infrastructure) certificate, and an authentication method using a question and an answer on information about a user's birthday or a pet name.

The portable apparatus may be one of a cellular phone, a personal digital assistant (PDA), a portable multimedia player (PMP), a portable Internet terminal, and a notebook computer.

The ubiquitous apparatuses may be a display for a display, such as a monitor or a television (TV), a presentation apparatus, such as a large LCD screen, a printer, or a speaker.

The wireless communication system may be one of wireless LAN, Bluetooth, and NFC (Near Field Communication).

The authentication token may include a unique value of the first authentication device, a unique value of the service provider, a service unique value, time information at which initial authentication is completed, and signature information.

The signature information of the authentication token may be encrypted by the authentication server of the service provider to protect the contents of the authentication token, and may be obtained by hashing the encrypted values of the unique value of the first authentication device, the unique value of the service provider, the service unique value, and the time information.

The signature information of the authentication token may be encrypted by one of secret key encryption, public key encryption, or message authentication code (MAC).

According to another aspect of the invention, a service provider server for a ubiquitous service includes: an authentication server module of a service provider that receives an access request message from a first authentication device of a portable apparatus, transmits an access permission and authentication data request message to the first authentication device of the portable apparatus, receives an authentication data request message including user authentication information from the first authentication device of the portable apparatus, and transmits an authentication token to the first authentication device of the portable apparatus; and a service data providing unit that, after service negotiation, provides service data to a ubiquitous apparatus.

The authentication server module of the service provider may receive and decrypt the encrypted authentication token from the first authentication device of the portable apparatus and a unique value of a second authentication device, and after authentication is verified, may provide desired service data.

The service data providing unit may negotiate a service quality with the ubiquitous apparatus connected to the second authentication device so as to provide the service data after authentication is verified, and may transmit desired service data to the ubiquitous apparatus connected to the second authentication device according to the negotiation result.

When wireless communication is disconnected between the first authentication device of the portable apparatus and the second authentication device of the ubiquitous apparatus, the service data providing unit may receive a service stop request message from the second authentication device, and may stop the transmission of the service data to the ubiquitous apparatus.

The service data providing unit may periodically check the connection between the first authentication device of the portable apparatus and the second authentication device of the ubiquitous apparatus, and if it is determined that they are disconnected from each other, may stop the transmission of the service data.

According to still another aspect of the invention, an authentication method for a ubiquitous service authentication gateway includes the steps of: (a) causing a first authentication device of a portable apparatus to transmit an access request message to an authentication server of a service provider, to receive an authentication token according to a prescribed authentication system, and to store the received authentication token in a main authentication unit thereof; (b) when a specific button on the first authentication device of the portable apparatus is pressed, causing the portable apparatus to operate as an authentication gateway; (c) when the first authentication device of the portable apparatus is connected to a second authentication device of a ubiquitous apparatus through a wireless communication system, requesting the second authentication device for its unique value and receiving the unique value from the second authentication device; (d) combining the authentication token stored in the main authentication unit of the first authentication device of the portable apparatus with the unique value of the second authentication device, and transmitting the combined authentication token and unique value to the authentication server, to thereby request a service; (e) causing the authentication server to receive the combined authentication token and unique value, and if the service is permitted, negotiating a service quality with the ubiquitous apparatus, to which the second authentication device is attached; and (f) causing the authentication server to provide service data to the ubiquitous apparatus, to which the second authentication device is attached.

The step (a) may include the substeps of: (a1) causing the first authentication device of the portable apparatus to transmit the access request message to the authentication server; (a2) causing the first authentication device of the portable apparatus to receive an access permission and authentication data request message from the authentication server; (a3) causing the first authentication device of the portable apparatus to transmit an authentication data request message to the authentication server according to the prescribed authentication system; and (a4) causing the first authentication device of the portable apparatus to receive the authentication token from the authentication server and to store the received authentication token in the main authentication unit thereof.

In the step (a), initial authentication may be performed only once, such that the first authentication device of the portable apparatus is used as the authentication gateway.

The step (b) may include the substeps of: (b1) displaying, on an LCD display unit of the portable apparatus, a desired service list and information about whether or not initial authentication is performed; (b2) when initial authentication of a ubiquitous service selected by a user is not performed, performs the initial authentication; and (b3) if the initial authentication of the selected service is completed, displaying connection information of a ubiquitous apparatus, to which the service is actually provided.

In the step (c), when the button on the first authentication device is pressed, the first authentication device and the second authentication device may come close to each other or come into contact with each other and may be connected with each other by a wireless communication system.

In the step (d), the authentication token and the unique value of the second authentication device may be combined with each other, encrypted, and transmitted to the authentication server.

The authentication method may further include a step of: when the first authentication device of the portable apparatus and the second authentication device of the ubiquitous apparatus are disconnected from each other, causing the second authentication device to transmit a service stop request message to the authentication server of the service provider.

The authentication method may further include the steps of, when the specific button on the first authentication device of the portable apparatus is pressed to request to stop the service: causing the first authentication device of the portable apparatus to transmit a service stop request message to the second authentication device of the ubiquitous apparatus; and causing the second authentication device to transmit the service stop request message to the authentication server of the service provider.

The authentication method may further include a step of: causing the authentication server of the service provider to periodically check the connection between the first authentication device of the portable apparatus and the second authentication device of the ubiquitous apparatus, and if they are disconnected from each other, to stop the transmission of the service data.

As described above, the first authentication device of the portable apparatus, such as a PDA, a PMP, a cellular phone, a portable Internet (WiBro) terminal, or a notebook computer, is used as the authentication gateway, which is a representative authentication device. Then, the authentication gateway perform authentication in connection with the authentication server of the service provider. In the ubiquitous service, when the same service is provided to various ubiquitous apparatuses, such as a computer, a display, and an acoustic apparatus, with different qualities, the first authentication device of the portable apparatus, which is used as the authentication gateway, performs authentication on behalf of the second authentication devices of the ubiquitous apparatuses. Therefore, it is possible to eliminate the inconvenience of performing authentication each time.

That is, the first authentication device of the portable apparatus is connected to the authentication server of the service provider to perform authentication as the authentication gateway on behalf of the ubiquitous apparatuses. Therefore, according to the ubiquitous service authentication gateway, it is possible to eliminate the inconvenience of performing authentication each time, and to prevent leakage of authentication information.

DESCRIPTION OF THE PREFERRED EMBODIMENTS

Hereinafter, an exemplary embodiment of the invention will be described in detail with reference to the accompanying drawings.

Figure 1:
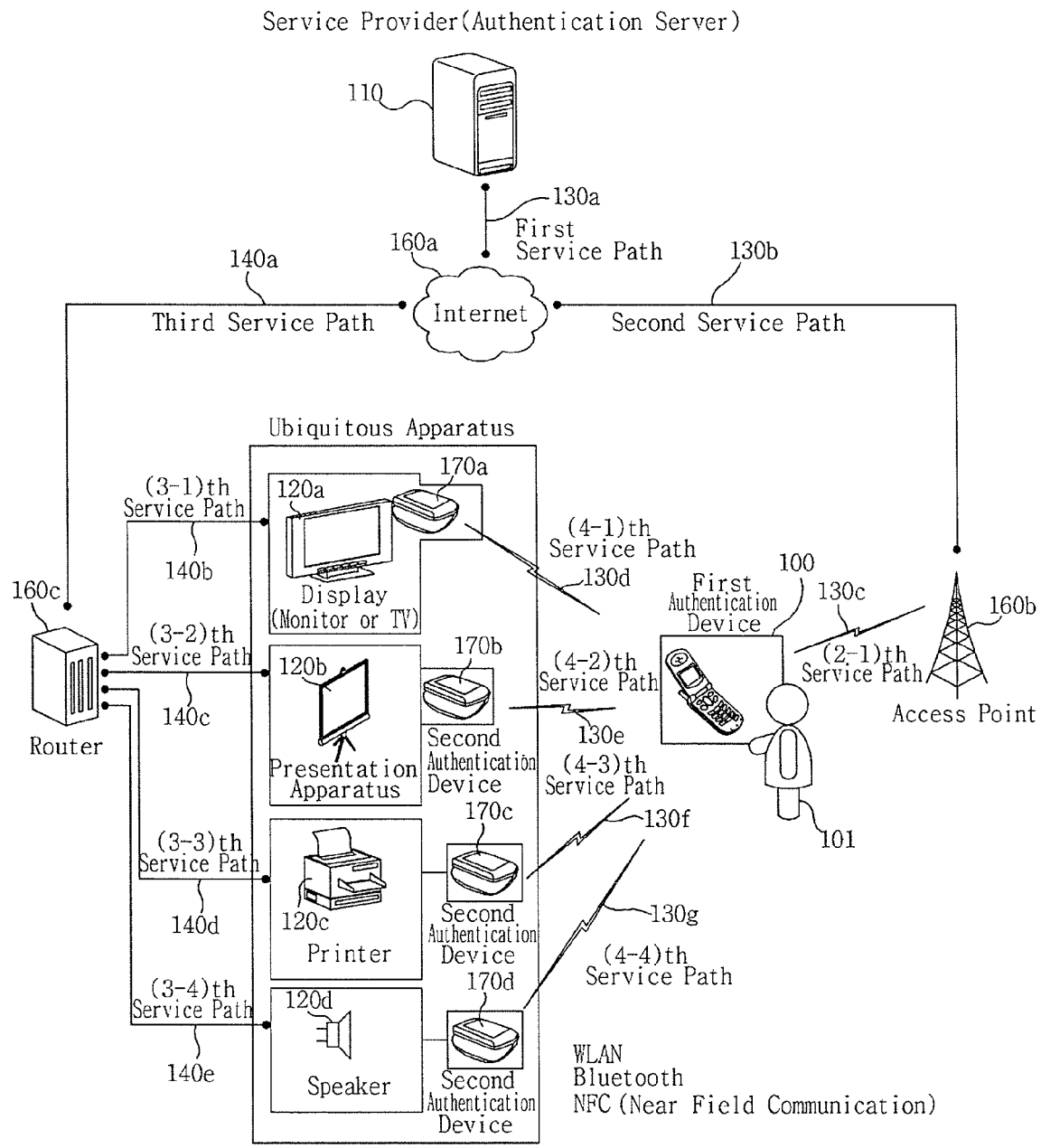
FIG. 1 is a diagram showing the configuration of an authentication gateway apparatus for accessing a ubiquitous service according to an embodiment of the invention.

FIG. 1 is a diagram showing the configuration of an authentication gateway apparatus for accessing a ubiquitous service according to an embodiment of the invention.

The authentication gateway apparatus for accessing a ubiquitous service includes an authentication server 110 of a service provider, a first authentication device 100 of a portable apparatus, one or more appliances 120*a* to 120*d*, and second authentication devices 170*a* to 170*d* that are attached to or incorporated in the ubiquitous apparatuses 120*a* to 120*d*.

A service provider server for a ubiquitous service includes: an authentication server module 110 of the service provider (hereinafter, referred to as "authentication server") that receives an access request message from the first authentication device 100 of the portable apparatus, transmits an access permission and authentication data request message to the first authentication device 100 of the portable apparatus, receives an authentication data request message including user authentication information from the first authentication device 100 of the portable apparatus, and transmits an authentication token to the first authentication device 100 of the portable apparatus; and a service data providing unit that, after service negotiation, provides service data to the ubiquitous apparatuses 120a to 120d.

The authentication server 110 of the service provider receives an access request message 200a from the first authentication device 100 of the portable apparatus to provide the ubiquitous service, transmits an access permission and authentication data request message 200b to the first authentication device 100 of the portable apparatus, receives an authentication data request message 200c including user authentication information from the first authentication device 100 of the portable apparatus, and transmits an authentication token 200d to the first authentication device 100 of the portable apparatus.

The service data providing unit negotiates a service quality with a ubiquitous apparatus connected to a second authentication device so as to provide service data after authentication is verified, and transmits desired service data to the ubiquitous apparatus connected to the second authentication device according to the negotiation result.

The service data providing unit receives a service stop request message from the second authentication device when wireless communication is disconnected between the first authentication device of the portable apparatus and the second authentication device of the ubiquitous apparatus, and stops the transmission of the service data to the ubiquitous apparatus.

The service data providing unit periodically checks the connection between the first authentication device of the portable apparatus and the second authentication device of the ubiquitous apparatus, and if it is determined that they are disconnected from each other, stops the transmission of the service data.

The portable apparatus may be a cellar phone, a personal digital assistant (PDA), a portable multimedia player (PMP), a portable Internet (WiBro) terminal, or a notebook computer.

The first authentication device 100 of the portable apparatus transmits the authentication data request message to the authentication server 110 of the service provider, and receives and stores the authentication token from the authentication server 110. The first authentication device 100 functions as an authentication gateway to perform authentication on behalf of the second authentication devices of the plurality of ubiquitous apparatuses 120a to 120d.

The ubiquitous apparatuses 120a to 120d are connected to the portable apparatus by a wireless communication system, such as wireless LAN (WLAN), Bluetooth, or NFC (Near Field Communication). The ubiquitous apparatuses 120a to 120d may be a display 120a, such as a monitor or a TV, a presentation apparatus 120b, such as a large LCD screen, a printer 120c, and a speaker 120d.

The second authentication devices 170a to 170d that are correspondingly attached to, incorporated in, or connected to the ubiquitous apparatuses 120a to 120d provides their unique values to the first authentication device 100 of the portable apparatus by a wireless communication system, such as wireless LAN (WLAN), Bluetooth, or NFC (Near Field Communication).

The service provider server provides various ubiquitous services to the portable apparatus, to which the first authentication device 100 is attached, or the ubiquitous apparatuses 120a to 120d, to which the second authentication devices 170a to 170d are attached, through different network paths.

In the ubiquitous computing environment, service paths 130a to 130g and 140a to 140e are network paths of LAN, WLAN, or portable Internet (WiBro), through which service data and control data for application services are transferred.

The ubiquitous service has another feature in that a high-quality service can be provided anytime and anywhere.

Referring to FIG. 1, for example, a user 101 can use a service from the service provider server through a first service path 130a, a second service path 130b, and a (2-1)th service path 130c with his/her portable apparatus.

Alternatively, the user 101 can use a service from the service provider server through the first service path 130a, a third service path 140a, and a (3-1)th service path 140b with the ubiquitous apparatus 120a.

In both examples, the user 101 can use the same service with different qualities. For example, in case of a ubiquitous service for providing photographs with different qualities, the portable apparatus displays a 240×320 photograph on an LCD screen, and the display 120a, which is a ubiquitous apparatus, displays a 1024×768 photograph on a TV.

The example where the same service is provided with different qualities is not limited to the service for providing photographs. Moreover, the ubiquitous apparatuses 120a to 120d are not limited to the display 120a, such as a monitor or a TV, the presentation apparatus 120b, the printer 120c, and the speaker 120d.

Referring to FIG. 1, Internet 160a, an access point 160b, and a router 160c are general entities that are provided to connect the service provider server with the portable apparatus 100 and the ubiquitous apparatuses 120a to 120d through the service paths 130a to 130g and 140a to 140e.

The ubiquitous apparatuses 120a to 120d are connected to the portable apparatus, to which the first authentication device 100 is attached and which is used as a representative authentication device of the user 101, through the service paths 130d to 130g, respectively.

As shown in FIG. 1, the second authentication devices 170a to 170d as auxiliary authentication devices are correspondingly connected to the ubiquitous apparatuses 120a to 120d.

The connections between the ubiquitous apparatuses 120a and 120d and the second authentication devices 170a 170d may be implemented by incorporating the second authentication device 170a in the display 120a, such as a monitor or a TV; attaching the second authentication device 170b to the presentation apparatus 120b; and connecting the second authentication devices 170c and 170d to the printer 120c and the speaker 120d, respectively.

The second authentication devices 170a to 170d that are connected to the ubiquitous apparatuses 120a to 120d are connected to the portable apparatus, to which the first authentication device 100 as a representative authentication device is attached, through the service paths 130d to 130g, respectively.

The service provider (SP) server includes the authentication server 110, and after the authentication server 110 performs user authentication, provides the ubiquitous service the portable apparatus to which first authentication device 100 is attached. For example, the portable apparatus, such as a PDA, a PMP, a cellular phone, or a notebook computer, to which the first authentication device 100 is attached, accesses the authentication server 110 of the service provider through the (2-1)th service path 130c, the second service path 130b, and the first service path 130a, and transmits user authentication information using an ID and a password to verify user authentication.

In the example of FIG. 1, a case where the service provider server also has an authentication function has been described, but a separate authentication server may have an authentication function.

The service paths 130a to 130c are entities for implementing services with different qualities. The terms of the entities and the positions on the service paths 130a 130c are not limited to the embodiment of the invention.

As the authentication method in the authentication server 110 of the service provider, an authentication method using a one-time password, an authentication method using an IC card, an authentication method using a security token, an authentication method using biological recognition, and an authentication method using a PKI (Public Key Infrastructure) certificate may be exemplified. The invention is not limited to a specific authentication method. For example, an authentication method using a question and an answer on information about a user's birthday or a pet name may be used.

When the user 101 performs user authentication with the portable apparatus, such as a cellular phone, a PDA, a PMP, a portable Internet terminal, or a notebook computer, the first authentication device 100, which is attached to the portable apparatus as a representative authentication device, includes: a main authentication unit 110a that transmits the authentication data request message for user authentication to the authentication server 110 of the service provider, and receives and stores the authentication token from the authentication server 110; and a first wireless communication unit 111a that performs wireless communication with the second authentication devices 170a to 170d of the ubiquitous apparatuses by a wireless communication system, such as wireless LAN (WLAN), Bluetooth, or NFC (Near Field Communication).

Each of the second authentication devices 170a to 170d, which are attached to the ubiquitous apparatuses 120a to 120d, includes: a second wireless communication unit 211b that performs wireless communication with the first authentication device 100 of the portable apparatus by the wireless communication system, such as wireless LAN (WLAN), Bluetooth, or NFC (Near Field Communication); and an auxiliary authentication unit 210b that receives a request to transmit a unique value of the second authentication device from the first authentication device 100 of the portable apparatus and transmits the stored unique value of the second authentication device.

Figure 2:
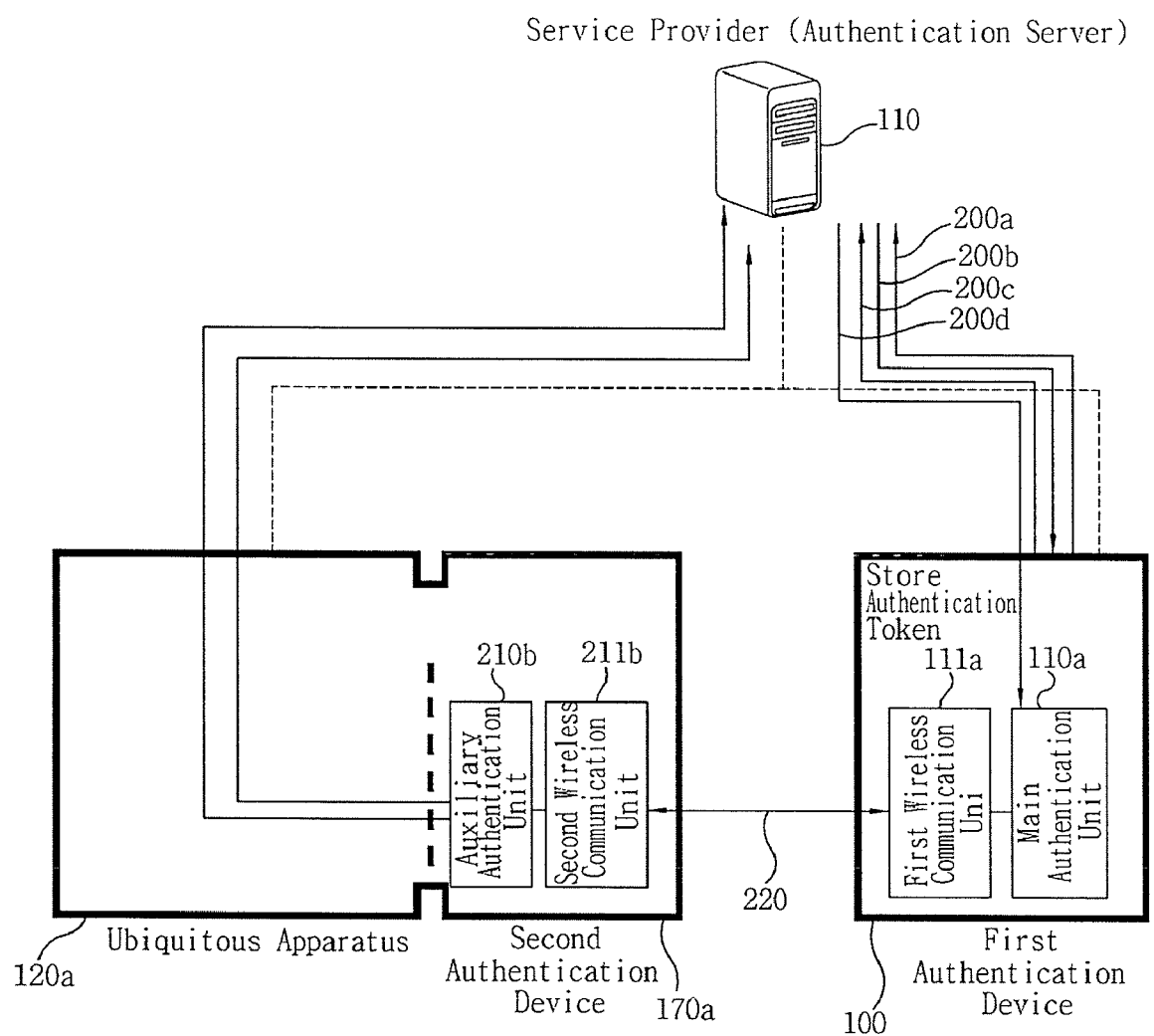
FIG. 2 is a diagram showing the configuration of a system having a first authentication device of a portable apparatus and a second authentication device of a ubiquitous apparatus according to an embodiment of the invention.

FIG. 2 is a diagram showing the configuration of a system having a first authentication device of a portable apparatus and a second authentication device of a ubiquitous apparatus according to an embodiment of the invention.

The first authentication device 100, the second authentication device 170a, and the authentication server 110 of the service provider have individual unique values (ID). The unique value may be an IP address in a general network or may be a predetermined value.

For the detailed description of the embodiment according to the invention, the unique values are set as follows. It is assumed that the unique value of the first authentication device 100 is 11112222, the unique value of the second authentication device 170a is 33334444, and the authentication server 110 of the service provider is 55556666.

In addition, a unique value is given to the service itself. It is assumed that the unique value of a service that the user 101 wants to use is 77778888 so as to identify which service the user 101 wants to use.

According to the embodiment of the invention, the user 101 accesses the authentication server 110 of the service provider through the first authentication device 100, which is his/her representative authentication device, to perform initial authentication, and then receives service data.

When the service data is received, the user 101 may use the first authentication device 100, but for a higher quality service, he/she may use the first authentication device 100 of the portable apparatus as an authentication gateway so as to use the peripheral ubiquitous apparatuses 120a to 120d.

In regards to the initial authentication, for example, an authentication method using a one-time password, an authentication method using an IC card, an authentication method using a security token, an authentication method using biological recognition, or an authentication method using a question and an answer on information about a user's birthday or a pet name may be used.

The initial authentication is performed only once so as to use the first authentication device 100 of the portable apparatus as the representative authentication device.

An authentication method for a ubiquitous service includes the steps of: causing the first authentication device 100 of the portable apparatus to transmit the access request message 200a to the authentication server 110 of the service provider; causing the first authentication device 100 of the portable apparatus to receive the access permission and authentication data request message 200b from the authentication server 110 of the service provider; causing the first authentication device 100 of the portable apparatus to transmit the authentication data request message 200c including user authentication information, such as the ID and password set by the authentication method to the authentication server 110 of the service provider; and causing the first authentication device 100 of the portable apparatus an authentication result data message (authentication token) 200d from the authentication server 110 of the service provider.

At the final step of the initial authentication, the first authentication device 100 of the portable apparatus stores the authentication result data message 200d transmitted from the authentication server 110 of the service provider in the main authentication unit 210a. Hereinafter, the authentication result data message stored in the main authentication unit 210a is referred to as "authentication token".

Figure 3:
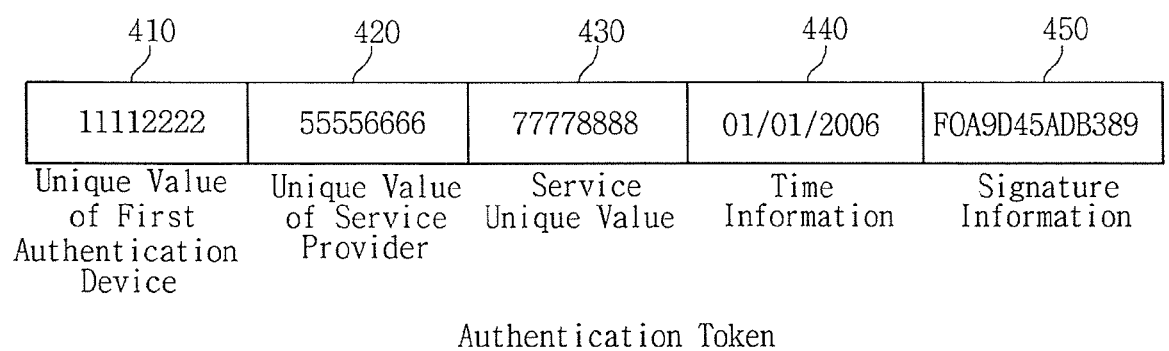
FIG. 3 is a diagram showing the data structure of an authentication token that is stored in a main authentication unit of a first authentication device of a portable apparatus.

FIG. 3 is a diagram showing the data structure of an authentication token that is stored in the main authentication unit of the first authentication device of the portable apparatus.

The authentication token includes the unique value 410 of the first authentication device 100, the unique value 420 of the service provider, the service unique value 430, time information 440 at which the initial authentication is completed, and signature information 450.

The signature information 450 of the authentication token is encrypted to protect the contents of the authentication token, and the authentication server 110 of the service provider can determined from the signature information whether or not the token value is changed. The signature information is encrypted and generated together with the authentication result data message 200d when the authentication server 110 of the service provider generates the authentication result data message 200d.

The signature information is generated by H(E(the unique value of the first authentication device, the unique value of the service provider, the service unique value, time information)).

Here, 'E' represents encryption. A key that is used to encrypt the signature information is a value that is known to only the authentication server 110 of the service provider. 'H' represents a strong hash in cryptology. That is, the signature information is calculated by hashing a value, which is obtained by encrypting the unique values and the time information. The signature information of the authentication token is encrypted one of secret key encryption, public key encryption, and message authentication code (MAC).

After the authentication token according to the initial authentication is stored in the first authentication device 100 of the portable apparatus as the representative authentication device, the user 101 may use the first authentication device 100 to receive the service data, or may use the peripheral ubiquitous apparatuses 120a to 120d with the first authentication device 100 as the authentication gateway for a higher quality service in the ubiquitous environment.

After the first authentication device 100 of the portable apparatus stores the authentication token according to the initial authentication in the main authentication unit 110a, the user 101 performs a procedure to use the first authentication device 100 of the portable apparatus as the authentication gateway, to thereby use the ubiquitous apparatuses 120a to 120d for the ubiquitous service.

During this procedure, the first authentication device 100 and the second authentication device 170a are connected with each other through a wireless communication path 220. The wireless communication path 220 may be provided by one wireless communication system of wireless LAN (WLAN), Bluetooth, and NFC (Near Field Communication).

According to the embodiment of the invention, the second authentication device 170a that is connected to the ubiquitous apparatus 120a is used as an intermediate path for authentication. The unique value of the second authentication device is stored in the auxiliary authentication unit 210b.

Figure 4:
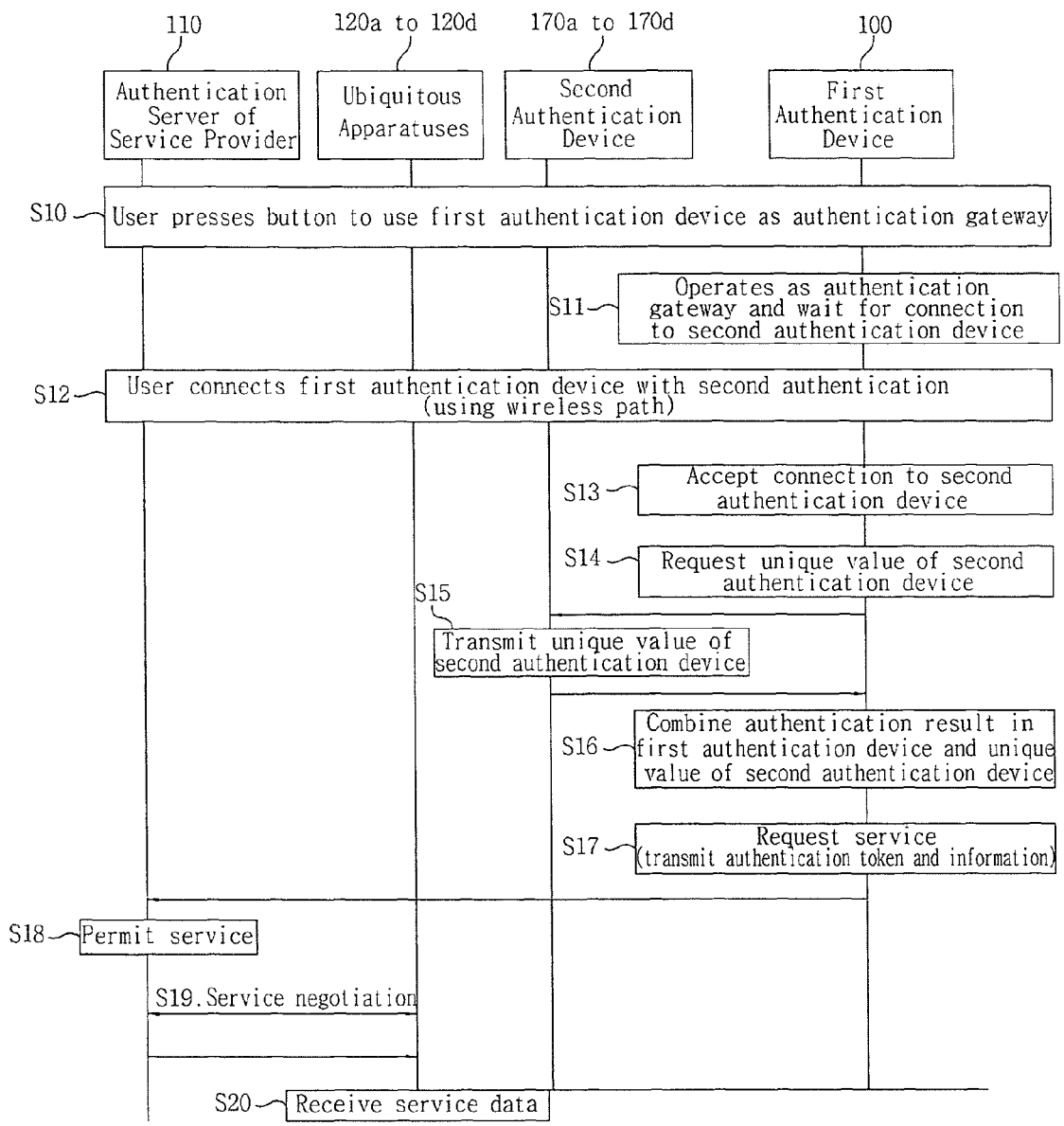
FIG. 4 is a flowchart illustrating the operation of a ubiquitous authentication gateway.

FIG. 4 is a flowchart illustrating the operation of a ubiquitous authentication gateway.

Referring to FIG. 4, the operation by the user 101 is indicated by a dotted line so as to be identified from the operations of the individual entities.

At an initial step, if the user 101 presses a button to allow the first authentication device 100 of the portable apparatus to operate as the authentication gateway (Step S10), the first authentication device 100 of the portable apparatus operates as the authentication gateway and waits for connection to the second authentication device 170a to 170d of the ubiquitous apparatuses 120a to 120d (Step S11).

The operation to allow the first authentication device 100 of the portable apparatus to operate as the authentication gateway by pressing the button on the portable apparatus according to the user's demand includes the steps of: displaying a desired service list with the first authentication device 100 of the portable apparatus; when the service list is displayed, displaying information about whether or not the initial authentication is performed; when the user selects a desired service, if initial authentication of the selected service is not performed, performing the initial authentication; and when the initial authentication of the selected service is performed, displaying connection information of a ubiquitous apparatus to which the service is actually provided.

Subsequently, the first authentication device 100 of the portable apparatus is connected to one of the second authentication devices 170a to 170d corresponding to the selected one of the display 120a, the presentation apparatus 120b, the printer 120c, and the speaker 120d by one wireless communication system of wireless LAN (WLAN), Bluetooth, and NFC (Near Field Communication) (Step S12).

when the specific button is pressed such that the first authentication device 100 of the portable apparatus operates as the authentication gateway, the first authentication device 100 of the portable apparatus and the second authentication device of the ubiquitous apparatus may come close to each other within a predetermined distance or come into contact with each other and may be connected with each other by the wireless communication system.

Hereinafter, an example where a service is provided through the second authentication device 170a of the display 120a, such as a monitor or a TV, which is connected to the first authentication device 100 of the portable apparatus, will be described.

The first authentication device 100 of the portable apparatus is connected to the second authentication device 170a of the display 120a (Step S13), and then requests the second authentication device 170a of the display 120a for its unique value (Step S14).

The second authentication device 170a of the display 120a transmits its unique value to the first authentication device 100 of the portable apparatus in response to the request (Step S15).

The first authentication device 100 of the portable apparatus combines the authentication token stored in the main authentication unit 110a and the unique value of the second authentication device (Step S16), and transmits the combined authentication token and unique value to the authentication server 110 of the service provider, to thereby request the service (Step S17).

The first authentication device 100 of the portable apparatus combines the authentication token and the unique value of the second authentication device, encrypts the combined authentication token and unique value such that other devices cannot intentionally change the combination, and transmits the combined authentication token and unique value to the authentication server 110 of the service provider.

The authentication server 110 of the service provider receives and decrypts the encrypted authentication token and unique value from the first authentication device 100 of the portable apparatus, determines whether or not to provide the service, and if authentication is verified, provides desired service data (Step S18).

When the selected ubiquitous service is provided, the authentication server 110 of the service provider negotiates a service quality with the ubiquitous apparatus 120a to which the second authentication device 170a is attached (Step S19). The authentication server 110 of the service provider provides desired service data to the ubiquitous apparatus 120a, to which second authentication device 170a is attached, according to the negotiation result (Step S20).

While the authentication server 110 of the service provider provides service data to the ubiquitous apparatus 120a, if the first authentication device 100 of the portable apparatus and the second authentication device 170a of the ubiquitous apparatus 120a are out of the predetermined distance range, and wireless communication is disconnected, the authentication server 110 of the service provider immediately stops the service.

If the first authentication device 100 of the portable apparatus and the second authentication device 170a of the ubiquitous apparatus 120a are separated by a predetermined distance from each other, the authentication server 110 of the service provider stops the transmission of the service data.

If a button on the portable apparatus, to which the first authentication device 100 is attached, is pressed to stop the service, if the first authentication device 100 of the portable apparatus and the second authentication device 170a of the ubiquitous apparatus 120a are disconnected from each other, or if the authentication server 110 of the service provider periodically checks the connection between the first authentication device 100 of the portable apparatus and the second authentication device 170a of the ubiquitous apparatus 120a, and it is determined that they are disconnected from each other, the authentication server 110 of the service provider stops the transmission of the service data.

The service stop operation when the button on the portable apparatus, to which the first authentication device 100 is attached, is pressed includes the steps of: causing the first authentication device 100 of the portable apparatus to transmit the service stop request message to the second authentication device 170a of the ubiquitous apparatus 120a; causing the second authentication device 170a of the ubiquitous apparatus 120a to transmit the service stop request message to the authentication server 110 of the service provider; and examining the service stop request message received by the authentication server 110 of the service provider and stopping the transmission of the service data.

The service stop operation due to the disconnection of the first authentication device 100 of the portable apparatus from the second authentication device 170a of the ubiquitous apparatus 120a includes the steps of: causing the second authentication device 170a of the ubiquitous apparatus 120a to transmit the service stop request message to the authentication server 110 of the service provider; and causing the authentication server 110 to stop the transmission of the service data.

The service stop operation when the authentication server 110 of the service provider periodically checks the connection between the first authentication device 100 of the portable apparatus and the second authentication device 170a of the ubiquitous apparatus 120a includes the steps of: causing the first authentication device 100 of the portable apparatus to transmit the service stop request message to the second authentication device 170a of the ubiquitous apparatus 120a; causing the second authentication device 170a of the ubiquitous apparatus 120a to transmit the service stop request message to the authentication server 110 of the service provider; and causing the authentication server 110 of the service provider to examine the service stop request message and stop the transmission of the service data.

Although the invention has been described in connection with the preferred embodiments, various modifications or changes may be made by those skilled in the art without departing from the spirit and scope of the invention defined by the appended claims.

What is claimed is:

1. An authentication gateway apparatus for accessing a ubiquitous service, comprising:
   a first authentication device of a portable apparatus that transmits an authentication data request message to an authentication server of a service provider, and receives and stores an authentication token from the authentication server;
   a plurality of ubiquitous apparatuses that are connected to the portable apparatus via wireless communication; and
   second authentication devices that are connected to the first authentication device of the portable apparatus by a wireless communication scheme, have individual unique values, and are correspondingly attached to, incorporated in, or connected to the ubiquitous apparatuses, and
   wherein, when the first authentication device of the portable apparatus is connected to the second authentication device of the ubiquitous apparatus through the wireless communication, the first authentication device requests its unique value from the second authentication device and receives the unique value from the second authentication device, and
   wherein the first authentication device combines the stored authentication token with the unique value of the second authentication device, and transmits the combined authentication token and unique value to the authentication server, to thereby access the ubiquitous service.

2. The authentication gateway apparatus of claim 1, wherein the first authentication device includes:
   a main authentication unit that transmits the authentication data request message to the authentication server, and receives and stores the authentication token from the authentication server; and
   a first wireless communication unit that is connected to the second authentication devices by the wireless communication scheme.

3. The authentication gateway apparatus of claim 1, wherein each of the second authentication devices includes:
   a second wireless communication unit that is connected to the first authentication device of the portable apparatus by the wireless communication scheme; and
   an auxiliary authentication unit that receives a request to transmit the unique value of the corresponding second authentication device from the first authentication device of the portable apparatus, and transmits the stored unique value of the second authentication device to the first authentication device of the portable apparatus.

4. The authentication gateway apparatus of claim 1, wherein the second authentication devices are correspondingly attached to, incorporated in, or connected to the ubiquitous apparatuses, and may be connected to the authentication server of the service provider through different network paths.

5. The authentication gateway apparatus of claim 1, wherein the ubiquitous apparatuses comprise at least one of a display device, a presentation apparatus, a printer, and a speaker.

6. The authentication gateway apparatus of claim 1, wherein the authentication token includes a unique value of the first authentication device, a unique value of the service provider, a service unique value, time information when initial authentication is completed, and signature information.

7. A service provider server for a ubiquitous service, comprising:
   a processor; and
   a memory having stored thereon:
   an authentication server module of a service provider that receives an access request message from a first authentication device of a portable apparatus, transmits an access permission and authentication data request message to the first authentication device of the portable apparatus, receives an authentication data request message including user authentication information from the first authentication device of the portable apparatus, and transmits an authentication token to the first authentication device of the portable apparatus; and a service data providing unit that, after service negotiation, provides service data to a ubiquitous apparatus, wherein the authentication server module of the service provider receives and decrypts the encrypted authentication token from the first authentication device of the portable apparatus and a unique value of a second authentication device of the ubiquitous apparatus, and after authentication is verified, provides desired service data to the ubiquitous apparatus, and wherein, when the first authentication device of the portable apparatus is connected to the second authentication device of the ubiquitous apparatus through a wireless communication, the first authentication device requests its unique value from the second authentication device and receives the unique value from the second authentication device and combines the authentication token with the unique value of the second authentication device, and wherein the authentication server module of the service provider server receives the combined authentication token and unique value of the second authentication device from the first authentication device.

8. The service provider server of claim 7, wherein the service data providing unit negotiates a service quality with the ubiquitous apparatus connected to the second authentication device so as to provide the service data after authentication is verified, and transmits desired service data to the ubiquitous apparatus connected to the second authentication device according to the negotiation result.

9. The service provider server of claim 7, wherein, when wireless communication is disconnected between the first authentication device of the portable apparatus and the second authentication device of the ubiquitous apparatus, the service data providing unit receives a service stop request message from the second authentication device, and stops the transmission of the service data to the ubiquitous apparatus.

10. The service provider server of claim 7, wherein the service data providing unit periodically checks the connection between the first authentication device of the portable apparatus and the second authentication device of the ubiquitous apparatus, and if it is determined that they are disconnected from each other, stops the transmission of the service data to the ubiquitous apparatus.

11. An authentication method for a ubiquitous service authentication gateway, the authentication method comprising the steps of:

(a) causing a first authentication device of a portable apparatus to transmit an access request message to an authentication server of a service provider, to receive an authentication token according to a prescribed authentication system, and to store the received authentication token in a main authentication unit thereof;

(b) when a specific button on the first authentication device of the portable apparatus is pressed, causing the portable apparatus to operate as an authentication gateway;

(c) when the first authentication device of the portable apparatus is connected to a second authentication device of a ubiquitous apparatus through a wireless communication system, requesting its unique value from the second authentication device and receiving the unique value from the second authentication device;

(d) combining the authentication token stored in the main authentication unit of the first authentication device of the portable apparatus with the unique value of the second authentication device, and transmitting the combined authentication token and unique value to the authentication server, to thereby access the ubquitous service;

(e) causing the authentication server to receive the combined authentication token and unique value, and if the service is permitted, negotiating a service quality with the ubiquitous apparatus, to which the second authentication device is attached; and (f) based on the result of the negotiation, causing the authentication server to provide service data to the ubiquitous apparatus, to which the second authentication device is attached.

12. The authentication method of claim 11, wherein step (a) includes the substeps of:

(a1) causing the first authentication device of the portable apparatus to transmit the access request message to the authentication server;

(a2) causing the first authentication device of the portable apparatus to receive an access permission and authentication data request message from the authentication server;

(a3) causing the first authentication device of the portable apparatus to transmit an authentication data request message to the authentication server according to the prescribed authentication system; and (a4) causing the first authentication device of the portable apparatus to receive the authentication token from the authentication server and to store the received authentication token in the main authentication unit thereof.

13. The authentication method of claim 11, wherein, in the step (a), initial authentication is performed only once, such that the first authentication device of the portable apparatus is used as the authentication gateway.

14. The authentication method of claim 11, wherein causing the portable apparatus to operate as an authentication gateway includes the substeps of:

(b1) displaying, on an LCD display unit of the portable apparatus, a desired service list and information about whether or not initial authentication is performed;

(b2) when initial authentication of a ubiquitous service selected by a user is not performed, performing the initial authentication; and (b3) if the initial authentication of the selected service is completed, displaying connection information of a ubiquitous apparatus, to which the service is actually provided.

15. The authentication method of claim 11, wherein, in the step (c), when the button on the first authentication device is pressed, the first authentication device and the second authentication device come close to each other or come into contact with each other and are connected with each other via wireless communication.

16. The authentication method of claim 11, wherein, in the step (d), the authentication token and the unique value of the second authentication device are combined with each other, encrypted, and transmitted to the authentication server.

17. The authentication method of claim 11, further comprising a step of:

when the first authentication device of the portable apparatus and the second authentication device of the ubiquitous apparatus are disconnected from each other, causing the second authentication device to transmit a service stop request message to the authentication server of the service provider.

18. The authentication method of claim 11, further comprising the steps of, when the specific button on the first authentication device of the portable apparatus is pressed to request to stop the service:
 causing the first authentication device of the portable apparatus to transmit a service stop request message to the second authentication device of the ubiquitous apparatus; and
 causing the second authentication device to transmit the service stop request message to the authentication server of the service provider.

19. The authentication method of claim 11, further comprising a step of:
 causing the authentication server of the service provider to periodically check the connection between the first authentication device of the portable apparatus and the second authentication device of the ubiquitous apparatus, and if they are disconnected from each other, to stop the transmission of the service data.

* * * * *